US011057339B1

(12) United States Patent
Stoddart et al.

(10) Patent No.: US 11,057,339 B1
(45) Date of Patent: Jul. 6, 2021

(54) SYSTEMS AND METHODS FOR PROVIDING AN ONLINE PLATFORM FOR FACILITATING A COMMUNICATION CONNECTION BETWEEN AN INDIVIDUAL AND AN ELECTED OFFICIAL

(71) Applicant: Phone2Action, Inc., Washington, DC (US)

(72) Inventors: Patrick Stoddart, Washington, DC (US); Jebidiah Ory, Washington, DC (US); Ximena Hartsock, Alexandria, VA (US)

(73) Assignee: Phone2Action, Inc., Washington, DC (US)

( * ) Notice: Subject to any disclaimer, the term of this patent is extended or adjusted under 35 U.S.C. 154(b) by 1067 days.

(21) Appl. No.: 14/165,539

(22) Filed: Jan. 27, 2014

(51) Int. Cl.
*G06F 11/00* (2006.01)
*H04L 12/58* (2006.01)

(52) U.S. Cl.
CPC .................... *H04L 51/38* (2013.01)

(58) Field of Classification Search
CPC ....................................... H04L 51/38
USPC .......................................... 705/12
See application file for complete search history.

(56) References Cited

U.S. PATENT DOCUMENTS

| | | | | |
|---|---|---|---|---|
| 6,268,826 B1 * | 7/2001 | Schmidt | ............. | H04B 7/18517 342/359 |
| 8,374,636 B2 * | 2/2013 | McDonough | ........... | H04L 51/38 455/412.1 |
| 8,744,908 B2 * | 6/2014 | Kalb | ....................... | G06Q 30/02 705/14.41 |
| 8,898,157 B2 * | 11/2014 | Levinson | ................ | G06Q 10/10 707/728 |
| 2009/0064144 A1 * | 3/2009 | Abhyanker | .............. | G06F 16/29 718/100 |
| 2015/0058429 A1 * | 2/2015 | Liu | ......................... | H04L 51/34 709/206 |

OTHER PUBLICATIONS

Microsoft Computer Dictionary, Fifth Edition, 2002, Microsoft Press, p. 23.*

(Continued)

*Primary Examiner* — Azam A Ansari
*Assistant Examiner* — Michael I Ezewoko
(74) *Attorney, Agent, or Firm* — The Webb Law Firm

(57) ABSTRACT

Systems and methods for providing an online platform that enables an organization to provide information to interested individuals are described. The organization requests individuals to contact elected officials to express support, rejections or comments for specific issues. The online platform determines an advocate's elected official(s) and facilitates a communication connection between the advocate and an elected official(s). Geocoding is performed using the individual's street address and zip code to obtain geographical coordinates, and the coordinates are geomatched to district matching databases to determine the individual's elected officials. The individual selects a preferred method of connecting, and the platform enables and facilitates the connection. Further, the platform tracks and analyzes actions taken by advocates, provides analytical data about advocacy campaigns initiated by organizations, and also rates advocates based on the actions taken and the method by which the actions were taken to advocate for issues.

1 Claim, 23 Drawing Sheets

(56) References Cited

OTHER PUBLICATIONS

Mind—A Brief Introduction, John R. Searle, 2004, Oxford University Press, pp. 62-67.*
What is Thought, Eric Baum, The MIT Press, 2004, pp. 33-65.*
Robotics, Science and Systems III, Wolfram Burgard, Oliver Brock, and Cyrill Stachniss, The MIT Press, 2008, pp. 41-48.*
Sirgy, 2011, Springer Science, pp. 26, 72, 113-114.*

* cited by examiner

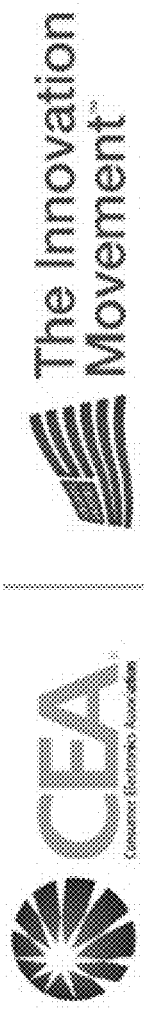
FIG. 7

Take Action Now!
  
*FIG. 9*

| 🔲 KEYWORD REPORT | | | | | Back | Export | Oth |
|---|---|---|---|---|---|---|---|
| Keyword | Description | Campaign | Texts ? | Advocates | | Conversion | Status |
| *MARY* | | Mary-Mary Registration | 21 | 12 | | 57% | Active |
| AZBECAS | | AZ Implementation - Spanish | 2 | 1 | | 50% | Active |
| AZKIDS | | AZ Implementation Campaign | 0 | 0 | | 0 | Active |
| AZLEARN | | AZ Implementation Campaign | 0 | 0 | | 0 | Active |
| AZNINOS | | AZ Implementation - Spanish | 6 | 5 | | 83% | Active |
| D.C. SCHOOLS | | DC Opportunity Scholarships | 0 | 0 | | 0 | Active |

*FIG. 17*

SYSTEMS AND METHODS FOR PROVIDING AN ONLINE PLATFORM FOR FACILITATING A COMMUNICATION CONNECTION BETWEEN AN INDIVIDUAL AND AN ELECTED OFFICIAL

BACKGROUND

Although constituents should be encouraged to communicate with the federal legislator elected to represent the respective constituent, the process can be difficult and burdensome. For example, a constituent may be inclined to visit the website for the United States House of Representatives as a starting point to determine his elected representative and to be directed to the appropriate website for sending a message electronically. However, the constituent must first enter the nine digit zip code corresponding to his home address before being directed to the correct elected official's webform. The nine digit zip code is required rather than merely the basic five digit zip code because multiple representatives may represent different sections of a region covered by a five digit zip code. Further, once the constituent has identified and entered the correct nine digit zip code, the webform presents many different fields, such as name, street address, city, state, email address, and telephone number, that are required to be completed before the constituent is allowed to submit a message to the elected official. The effort involved to contact an elected official by conventional methods can be quite burdensome and may even dissuade a constituent from following through with the communication to the representative. Similarly, identifying and communicating with elected officials at the local and state level can be equally challenging; as people need to determine who their officials are, how to contact them, and what to say.

BRIEF DESCRIPTION OF THE DRAWINGS

Examples of an online platform for facilitating a communication connection between an individual and an elected official or between an individual and a website for providing information of interest to the individual are illustrated in the figures. The examples and figures are illustrative rather than limiting.

FIG. 7 depicts a screenshot showing an example of a landing page for a short link.

FIG. 9 depicts a screenshot showing an example of a webpage for taking action via an email.

FIG. 17 depicts a screenshot showing a keyword report for an example campaign.

DETAILED DESCRIPTION

Systems and methods are described for providing an online platform that enables an organization to provide information to interested individuals about issues and/or policies and to facilitate the individuals' ability to take action to contact elected officials to express support or reject the issue or policy. Individuals are initially prompted to take action by a text message or by an advertisement using any suitable medium, such as radio, newspaper, social media, digital advertising, via links embedded into email messages, or via webpage action centers accessible online. The text-driven advertisements can include a keyword and a number to which an individual can text the keyword. In response to receiving the text with the keyword, the platform texts a short link to the individual, where the short link directs the individual to a landing page for the issue. At the landing page, the platform requests simple information, such as street address and zip code for the individual's residence. Others may engage with the opportunity to take action via digital advertising, links embedded within emails, or via organic web searches which take them to action centers; the technology described below facilitates actions across all of the above-mentioned mediums.

By geocoding the individual's street address and zip code to obtain geographical coordinates and geomatching the coordinates to district matching databases, the platform can determine each interested individual's elected officials. Then the platform facilitates a connection between the individual and the identified elected officials, where the individual can select a preferred method of connecting from one of the following: a phone call, an email message, and a Twitter message.

Further, the platform tracks and analyzes actions taken by advocates, provides analytical data about advocacy campaigns initiated by organizations, and also rates advocates based on the actions taken and the method by which the actions were taken to advocate for issues.

Various aspects and examples of the embodiments will now be described. The following description provides specific details for a thorough understanding and enabling description of these examples. One skilled in the art will understand, however, that the embodiments may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

Figure 1:
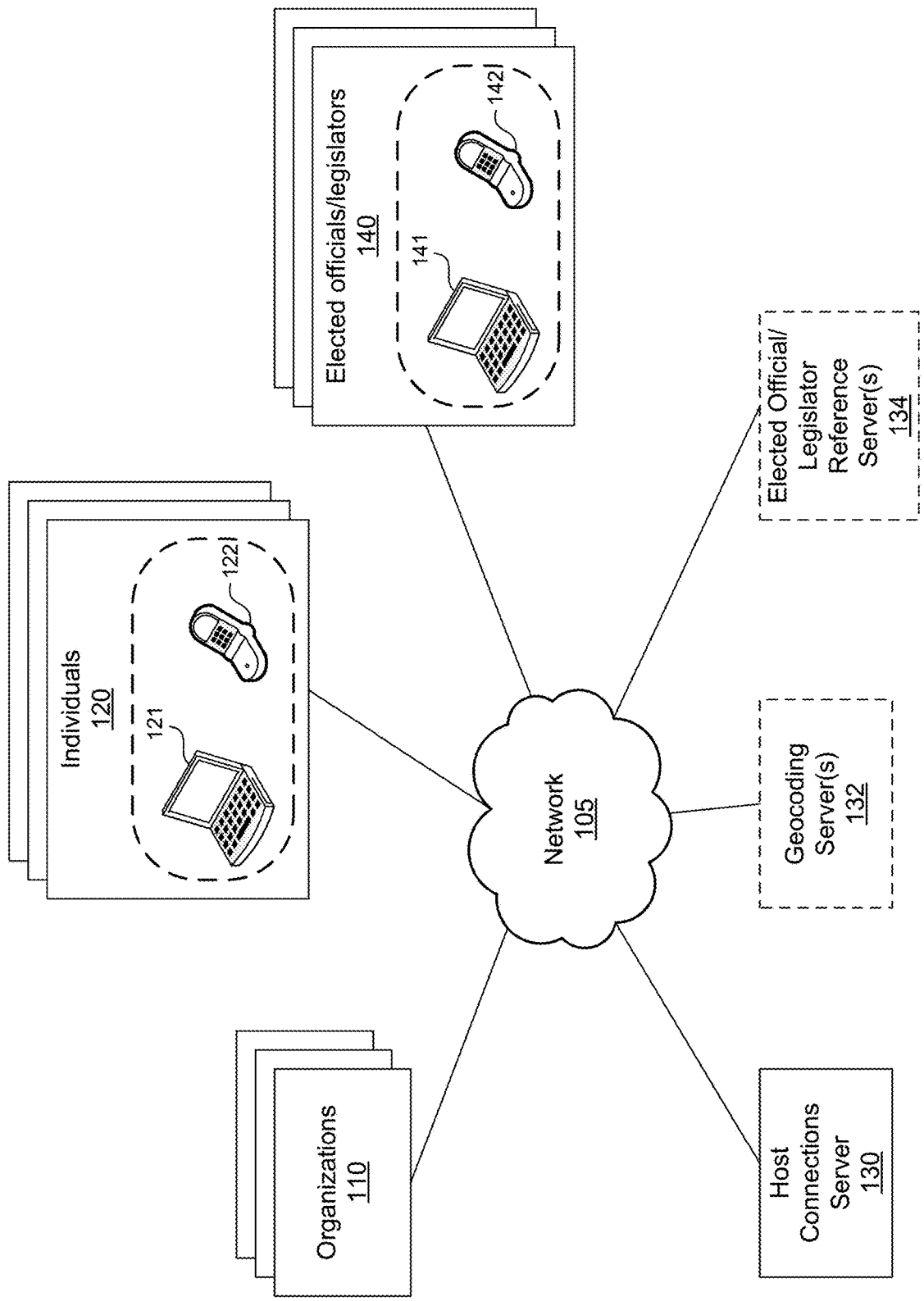
FIG. 1 illustrates a diagram of an example system where a host connections server supports facilitating a communication connection between an individual and an elected official.

FIG. 1 illustrates a diagram of an example system where a host connections server 130 supports targeting of individuals 120 by an organization 110 for taking one or more actions and facilitating the individuals' ability to take the actions. The organizations 110 can include any organization interested in contacting individuals 120 to advocate in support of an issue, where the individuals can be members of the organization, individuals known to the organization, or individuals who may not be known to the organization. The organizations 110 can also include any organization interested in providing a service, such as providing information about scholarships or other services that may be beneficial to individuals 120 in the general public. An "organization" may be, for example, a group such as a trade association, municipality, non-profit group, or corporation, but also may be an individual who has the resources to run a campaign.

In some embodiments, the host connections server 130 receives information about issues for an advocacy campaign from an organization 110 via the network 105 for communicating to specific individuals 120 via client devices 121, 122 and facilitates the use of client devices 121, 122 to take actions via the network 105. Actions that can be taken by individuals 120 include making a telephone call, sending an email message, and/or sending a Twitter message, or a message over another social network, to an elected official and/or legislator 140 using client devices 141, 142 in support of the campaign issue. Typically, the individual will contact the elected official/legislator 140 who serves the district in which the individual resides.

In some embodiments, the host connections server 130 receives text messages from individuals 120 containing a keyword that corresponds to a campaign issue or to a request for delivery of services, such as further information about an opportunity or an application form for a service. In response to receiving the keyword, the host connections server 130 sends a return text message containing a link to a website created for the delivery of the service that provides further information and/or an application form.

The client devices 121, 122, 141, 142 can be any system, device, and/or any combination of systems and devices that is able to establish a connection, including wired connections, wireless connections, cellular connections, email communication connections, text message communications connections, and/or Twitter message communication connections. Client devices 121, 122, 141, 142 will typically include a display and/or other output functionalities to present information and data exchanged between and among the devices 121, 122, 141, 142 and the host connections server 130.

The client devices 121, 122, 141, 142 can include mobile, hand held, or portable devices, or non-portable devices. Examples of client devices 121, 122, 141, 142 include, but are not limited to, a notebook computer, a laptop computer, a handheld computer, a mobile phone, a cell phone, a smart phone, a personal digital assistant (PDA), a tablet personal computer (PC), a desktop computer, and/or a fixed landline telephone. In the example of FIG. 1, the client devices 121, 122, 141, 142 and host connections server 130 are shown to be coupled via a network 105, however, in some cases, the devices 121, 122, 141, 142 and host connections server 130 may be directly connected to one another.

The network 105 can be any collection of distinct networks operating wholly or partially in conjunction to provide connectivity to the client devices 121, 122, 141, 142 and the connections server 130 and may appear as one or more networks to the serviced systems and devices. In some embodiments, communications to and from the client devices 121, 122, 141, 142 can be achieved by an open network, such as the Internet, or a private network, such as an intranet and/or the extranet.

In addition, communications can be achieved via one or more networks, such as, but not limited to, one or more of a Local Area Network (LAN), Wireless Local Area Network (WLAN), Personal area network (PAN), wireless wide area network (WWAN), enabled with technologies such as, by way of example, Global System for Mobile Communications (GSM), Personal Communications Service (PCS), Bluetooth, Wi-Fi, Fixed Wireless Data, 2G, 2.5G, 3G, 3G LTE, LTE Advanced, 4G, general packet radio service (GPRS), messaging protocols such as, TCP/IP, SMS, MMS, instant messaging, or any other wireless data networks or messaging protocols.

In some embodiments, the host connections server 130 includes functionality to allow it to communicate, for example, by using application programming interfaces (APIs), with one or more geocoding servers 132, and/or one or more elected official/legislator look-up reference servers 134. The geocoding server 132 receives as input a street address and/or a zip code and returns the latitude and longitude corresponding to the street address, while the elected official/legislator look-up reference server 134 receives the geocoding results comprising a latitude and longitude as input and determines the elected officials/legislators for the identified location.

In other embodiments, the functions performed by the geocoding servers 132 and/or the elected official/legislator reference servers 134 can be performed by the host connections server 130.

Figure 2:
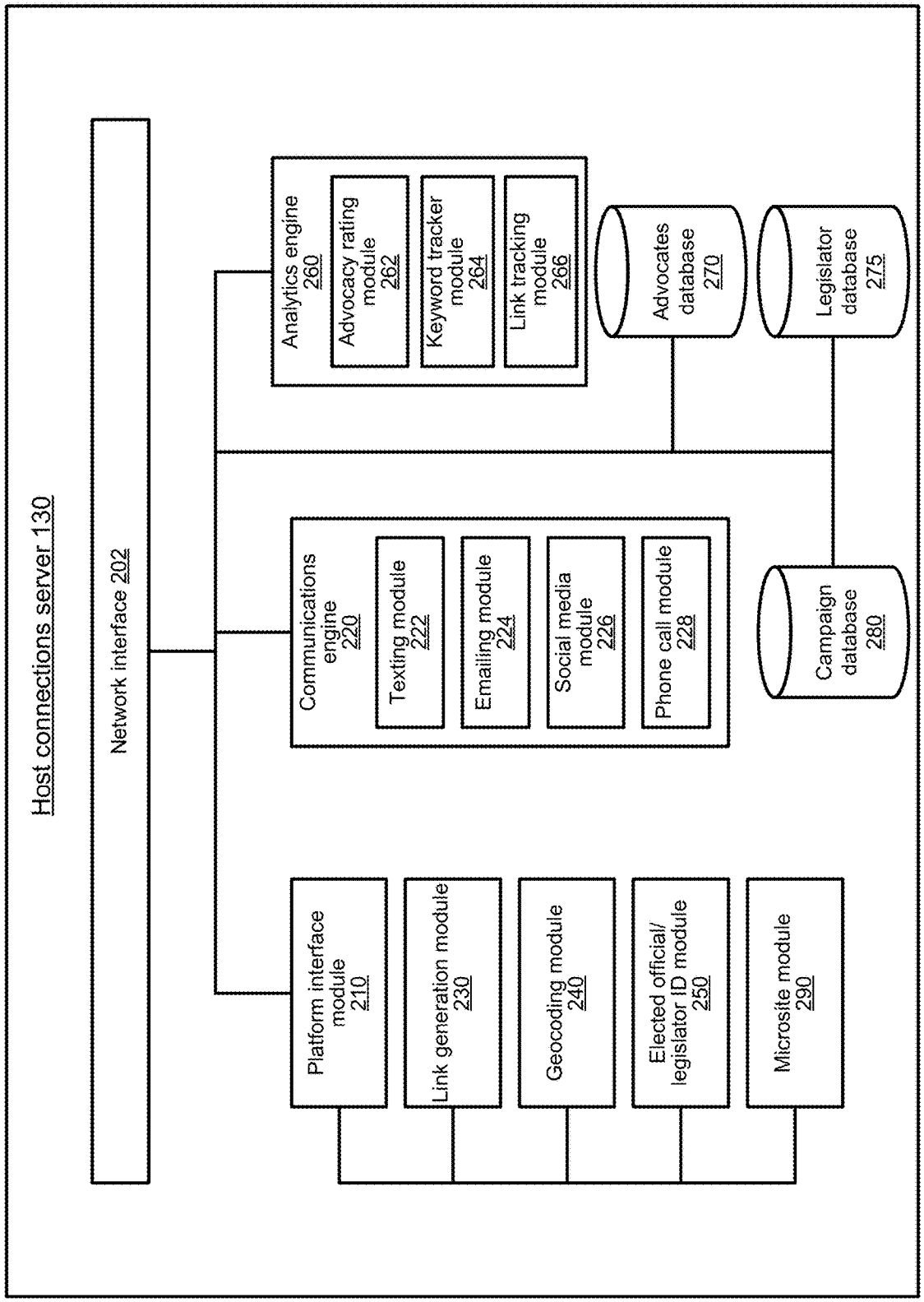
FIG. 2 depicts a block diagram illustrating an example of components in the host connections server.

FIG. 2 depicts a block diagram illustrating an example of components in the host connections server 130 that supports facilitating a communication connection between an individual and an elected official. The host connections server 130 can include, for example, a network interface 202, a platform interface module 210, a link generation module 230, a geocoding module 240, an elected official/legislator identification (ID) module 250, a microsite module 290, a communications engine 220, an analytics engine 260, an advocates database 270, a legislator database 275, and/or a campaign database 280. Additional or fewer components/modules/engines can be included in the host connections server 130 and each illustrated component.

The network interface 202 can be a networking module that enables the host connections server 130 to mediate data in a network with an entity that is external to the host connections server 130, through any known and/or convenient communications protocol supported by the host and the external entity. The network interface 202 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.,), Bluetooth, a router, an access point, a wireless router, a switch, a hub, a digital media receiver, and/or a repeater.

As used herein, a "module," or an "engine" includes a general purpose, dedicated or shared processor and, typically, firmware or software modules that are executed by the processor. Depending upon implementation-specific or other considerations, the module or engine can be centralized or its functionality distributed. The module or engine can include general or special purpose hardware, firmware, or software embodied in a computer-readable (storage) medium for execution by the processor. As used herein, a computer-readable medium or computer-readable storage medium is intended to include all media that are statutory (e.g., in the United States, under 35 U.S.C. 101), and to specifically exclude all media that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In some embodiments, the host connections server 130 includes the platform interface module 210. The platform interface module 210 provides a graphical user interface (GUI) for a representative of an organization to submit issue information to the host connections server 130 to be stored in the campaign database 280 and to enter advocate information to be stored in the advocates database 270. The platform interface module 210 also provides a GUI for the representative of an organization to enter information to be provided to individuals electing to advocate for an issue for the organization to be stored in the campaign database 280. The information can include instructions for calling an elected official/legislator, where the instructions can be text-based or recorded; a template email and/or template Twitter message, or other social media message, for the advocate to edit and send; follow-up messages (via email, text, or on a microsite website) to the advocate, and keyword selections corresponding to various issue campaign advertisements. Module 210 also allows a representative of an organization to select which elected officials/legislators should receive communications from advocates for the specific campaign. This selection can include, but is not limited to: party affiliation, legislative district, committee membership, caucus membership, and position on an issue. Module 210 may include the following adjustable settings for a campaign: time of launch of campaign, end of campaign, geographical reach of campaign, legislative reach of campaign, whether the campaign recipients are at the federal or local level, whether other elected officials such as governors or mayors may be recipients of communications.

In some embodiments, the host connections server 130 includes the microsite module 290 which generates and maintains a microsite or landing page for each issue campaign or service to be supported. For a campaign, the microsite or landing page is the webpage to which an advocate is directed to upon clicking on a short link sent by the server via any form of communication message deployed by communications engine 220. Similarly, for supporting service delivery, the landing page is the webpage to which a member of the general public is directed to upon clicking on a corresponding short link sent by the server.

In some embodiments, the host connections server 130 includes the link generation module 230 which generates the short link that links to the landing site for the corresponding campaign or service.

In some embodiments, the host connections server 130 includes the geocoding module 240 that uses API commands to communicate with one or more geocoding servers, such as Yahoo! BOSS Geo Services and Google Maps Geocoding Web Services. The geocoding module 240 sends the street address and/or zip code, depending on the input requirements of the geocoding server, to one or more geocoding servers and receives latitude and longitude geographic coordinates, along with normalized address components, that correspond to the provided street address and/or zip code.

In some embodiments, the host connections server 130 includes the elected official/legislator ID module 250 which uses API commands to communicate with one or more servers that provide information about elected officials/legislators at the local, state, and federal level, for a particular geographic coordinate. Example servers with which the elected official/legislator ID module 250 communicates with include Cicero, a legislative district matching and elected official info API; Google Civic Information API; Sunlight database API; and legislator database 275.

In some embodiments, the host connections server 130 includes the communications engine 220 which facilitates communications between an individual and an elected official/legislator and/or between an organization and an individual via a text message, email message, and/or phone call. The communications engine 220 can include a texting module 222, an emailing module 224, a social media module 226, and/or a phone call module 228.

Figure 3A:
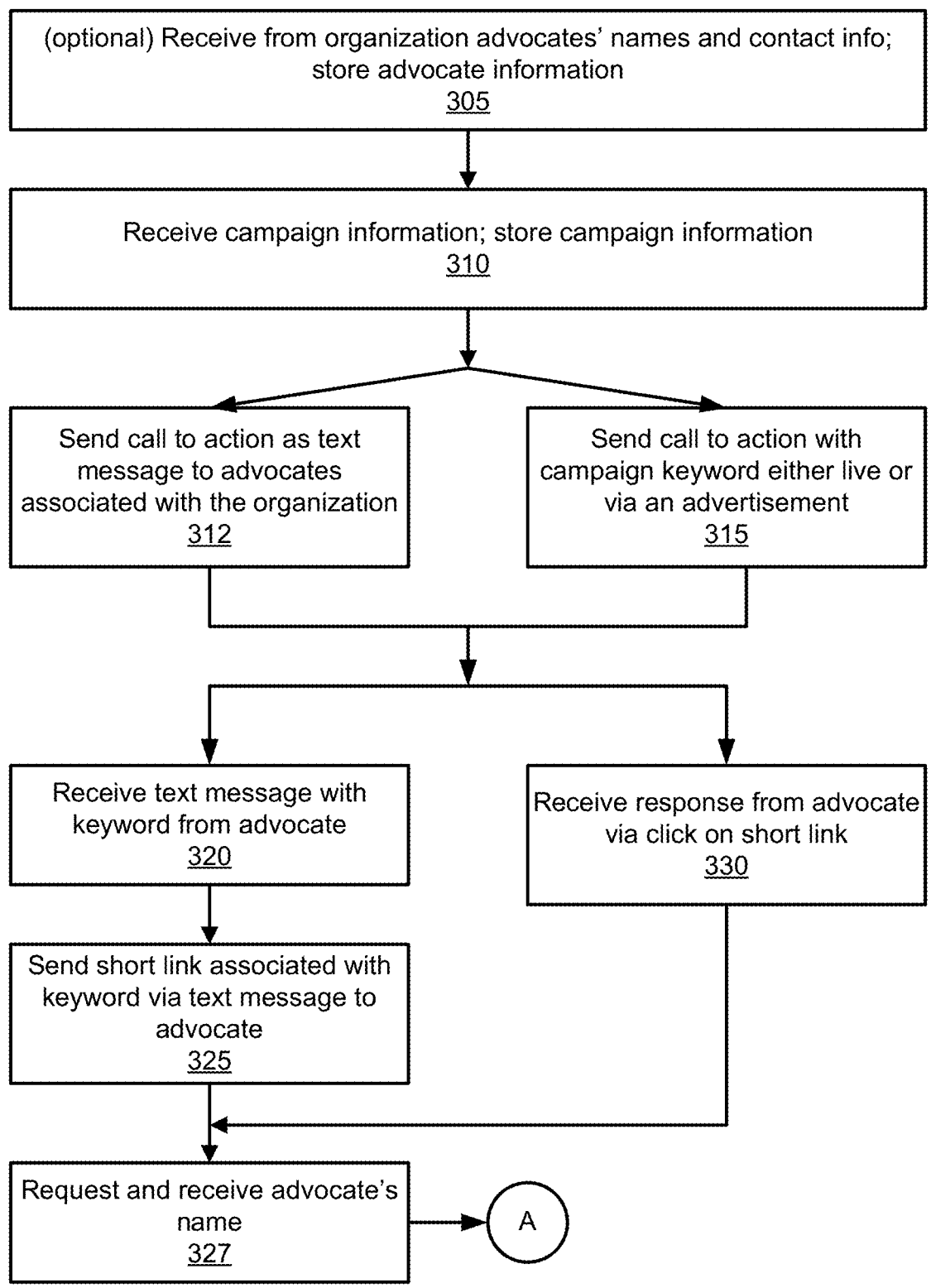
FIGS. 3A-3E depict a flow chart illustrating an example process for sending a request for advocacy to targeted individuals, and facilitating each individual's selected method of advocacy.
Figure 3B:
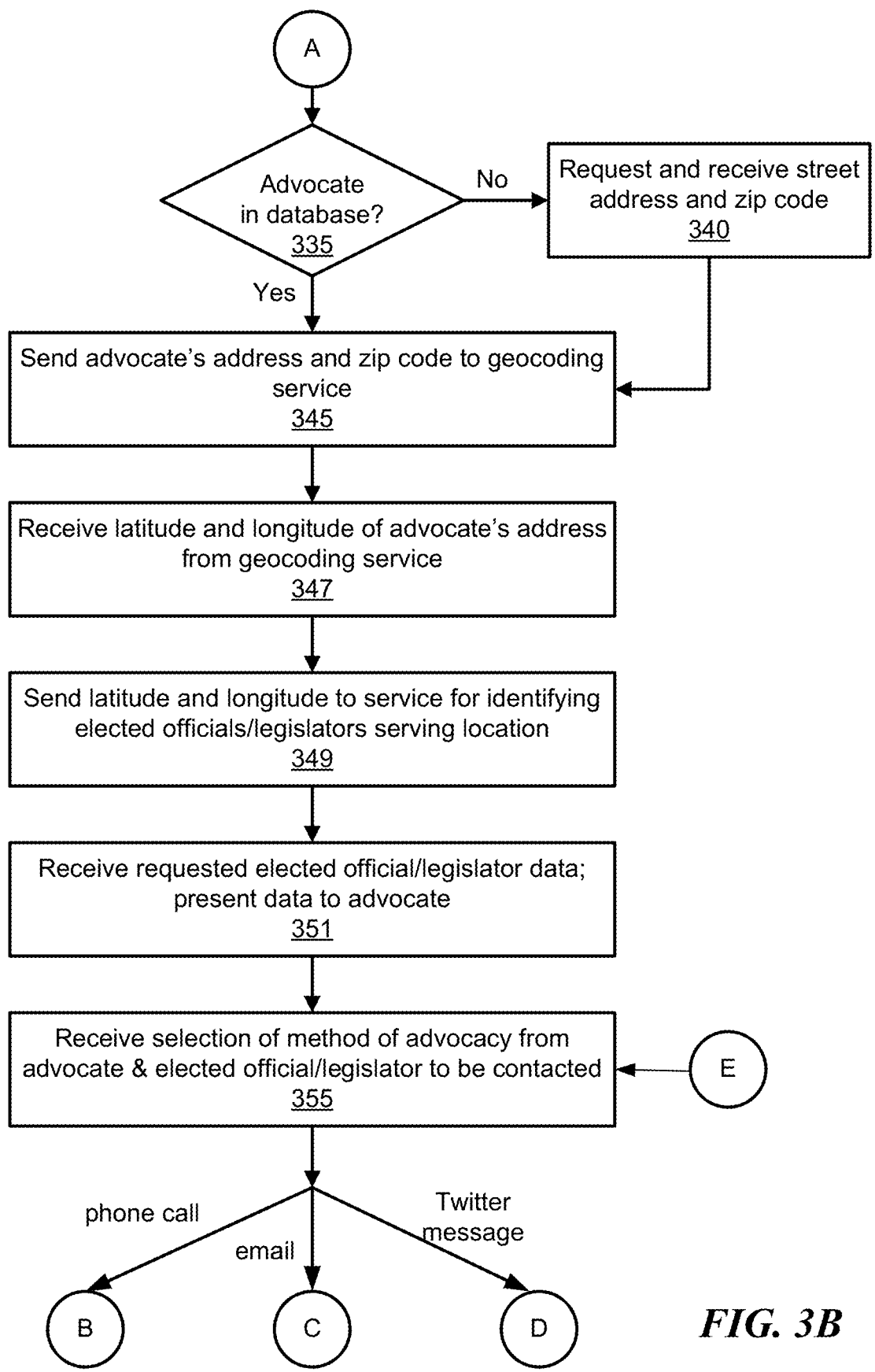
Figure 3C:
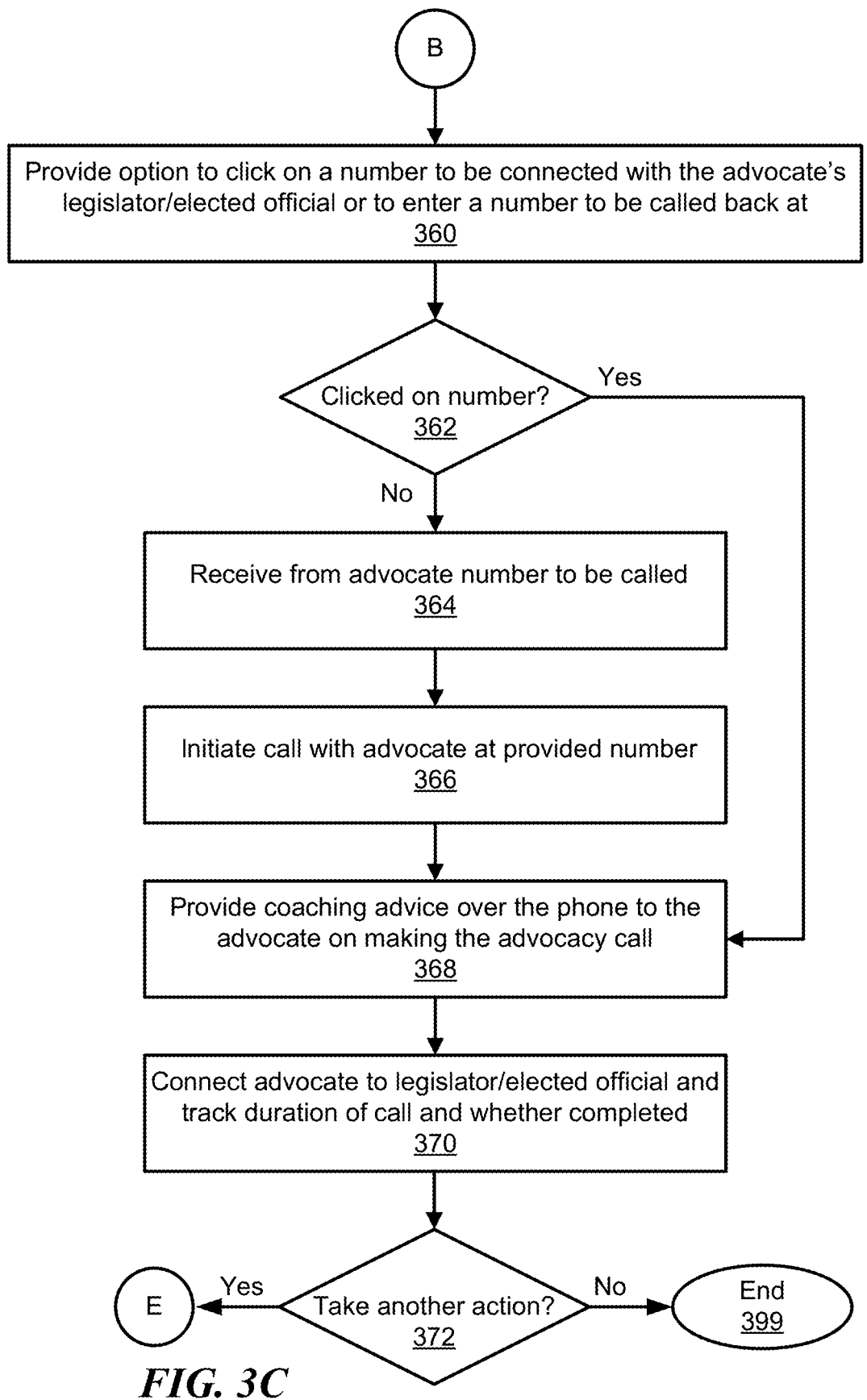

The phone call module 228 facilitates connecting an advocate by phone to a chosen elected official/legislator. The phone call module 228 obtains the advocate's phone number for connecting with the number of the chosen elected official/legislator, provides coaching advice to the advocate for making the call, and connects the advocate. Further, the phone call module 228 uses the service provided by Twilio, Inc. to track whether the call initiated by the advocate connected successfully to the elected official/legislator and the duration of the call. The blocks shown in the flow diagram of FIG. 3C are performed by the phone call module 228.

Figure 3D:
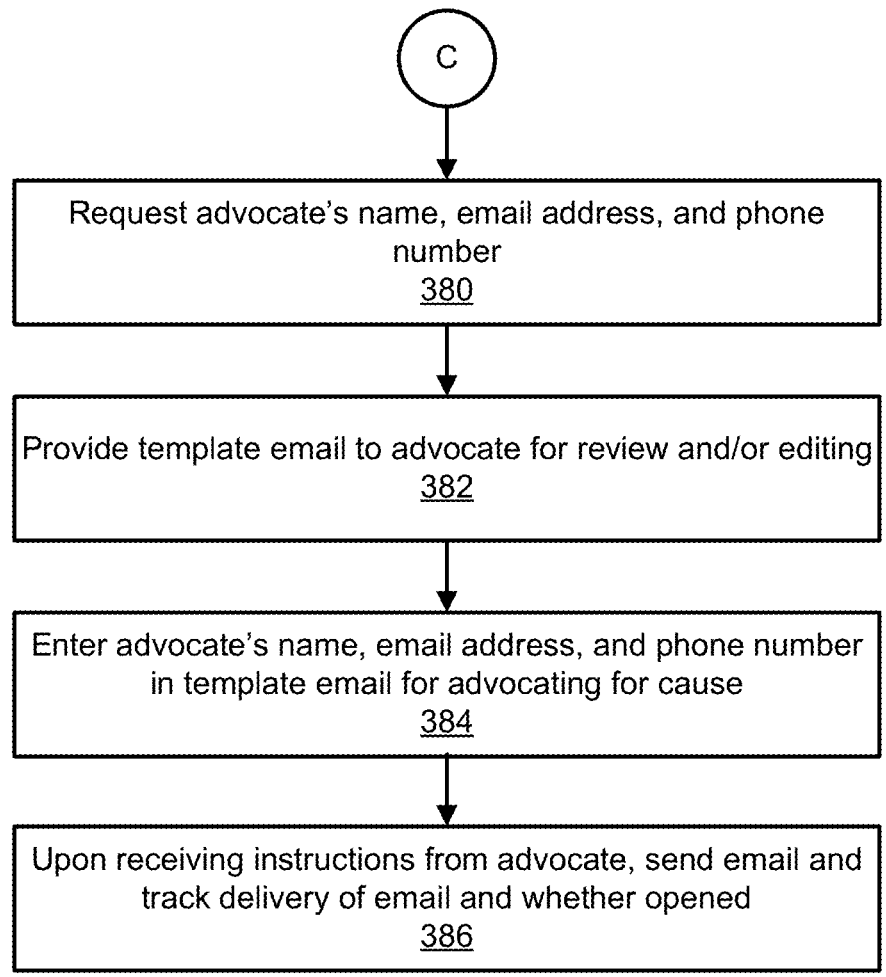
Figure 3E:
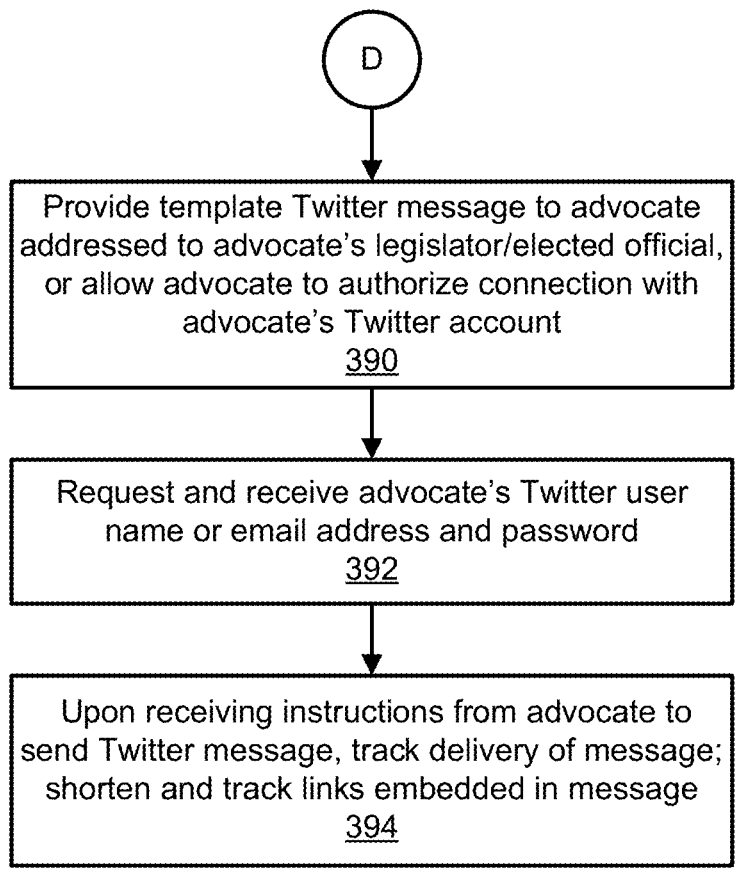

The texting module 222 facilitates the sending of a text message by a representative of an organization to an advocate. Additionally, the texting module 222 uses a text messaging gateway service currently provided by Twilio, Inc to track the delivery of the Twitter message sent by an advocate. The blocks shown in the flow diagram of FIG. 3E are performed by the texting module 222.

The emailing module 224 facilitates the sending of an email message by an advocate to a selected elected official/legislator. The emailing module 224 obtains the information needed to send an email, such as the advocate's email address and phone number, generates a template email message for the advocate to review and edit, and sends the email message upon approval by the advocate. The emailing module 224 can use a tracking pixel in the email to track whether the email has been opened by the recipient. The blocks shown in the flow diagram of FIG. 3D are performed by the emailing module 224.

The social media module 226 facilitates at least two processes: the sending of a social media message by an advocate to an elected official/legislator's social media account(s); and posting by the advocate of the call to action or related message to his/her own social media account(s). Both processes can be activated in at least two ways: 1) The advocate enters his/her social media account and password which deploys 226 to effect a one-time social media authorization, and 2) module 226 authenticates (using a protocol like OAuth) the advocate's social media account(s) on behalf of the advocate, for long-term use in subsequent campaigns. Module 226 facilitates these processes after a representative of the organization enters the relevant campaign or service description to be shared on the social media site, and the description includes information about the campaign or service, a custom-generated short-link to the microsite, and possibly details about the keyword for the campaign or service and the number to which the keyword should be sent to receive a short link with more information.

In some embodiments, the host connections server 130 includes the analytics engine 260 which tracks data pertaining to advocacy taken by individuals contacting an elected official/legislator. The analytics engine 260 can include an advocacy rating module 262, a keyword tracker module 264, and/or a link tracking module 266.

The analytics engine 260 tracks the number of advocates that take action for a given campaign, the time the action was taken, the type of action taken, the specific elected official/legislator that was contacted, and the contact information of the advocate that took the action. The analytics engine 260 can provide this information across all campaigns in a real-time activity feed on a dashboard that is accessible by administrators of the server for all campaigns, or a limited activity feed for a certain campaign for an organization can be provided to the administrator of that campaign. The analytics engine 260 can provide various displays of the tracked information, such as a color-coded map of the United States, where the color coding is based on the number of advocates who have taken action for a specific campaign, a listing of total number of advocates associated with a campaign and a total number of actions taken for a campaign, a listing of states, cities, or legislative districts; and the number of advocates from each region that have taken action for a campaign, a listing of the legislators and the number of times the legislators have been contacted for a campaign, a graph of growth over time of new advocates and social media followers for the organization's social media accounts, a change in new advocates over a given time period for a campaign, a listing of keywords associated with a campaign and the number of text messages received by the host connections server 130 with each of the keywords, and the number of actions taken as a result of that keyword, and a map of locations of advocates who have taken action.

Figure 6A:
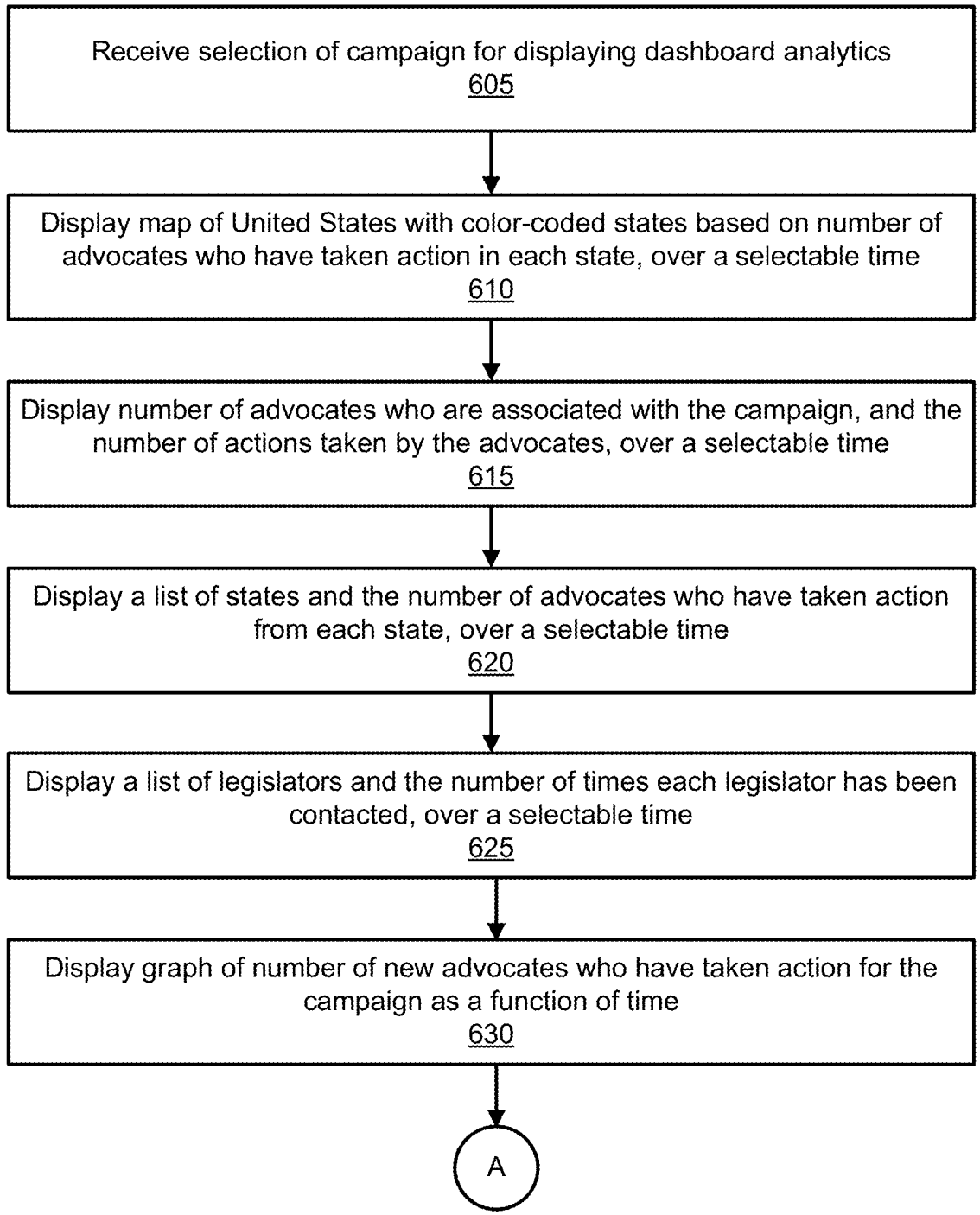
FIGS. 6A-6B depict a flow chart illustrating an example process for providing analytical information for a campaign.
Figure 6B:
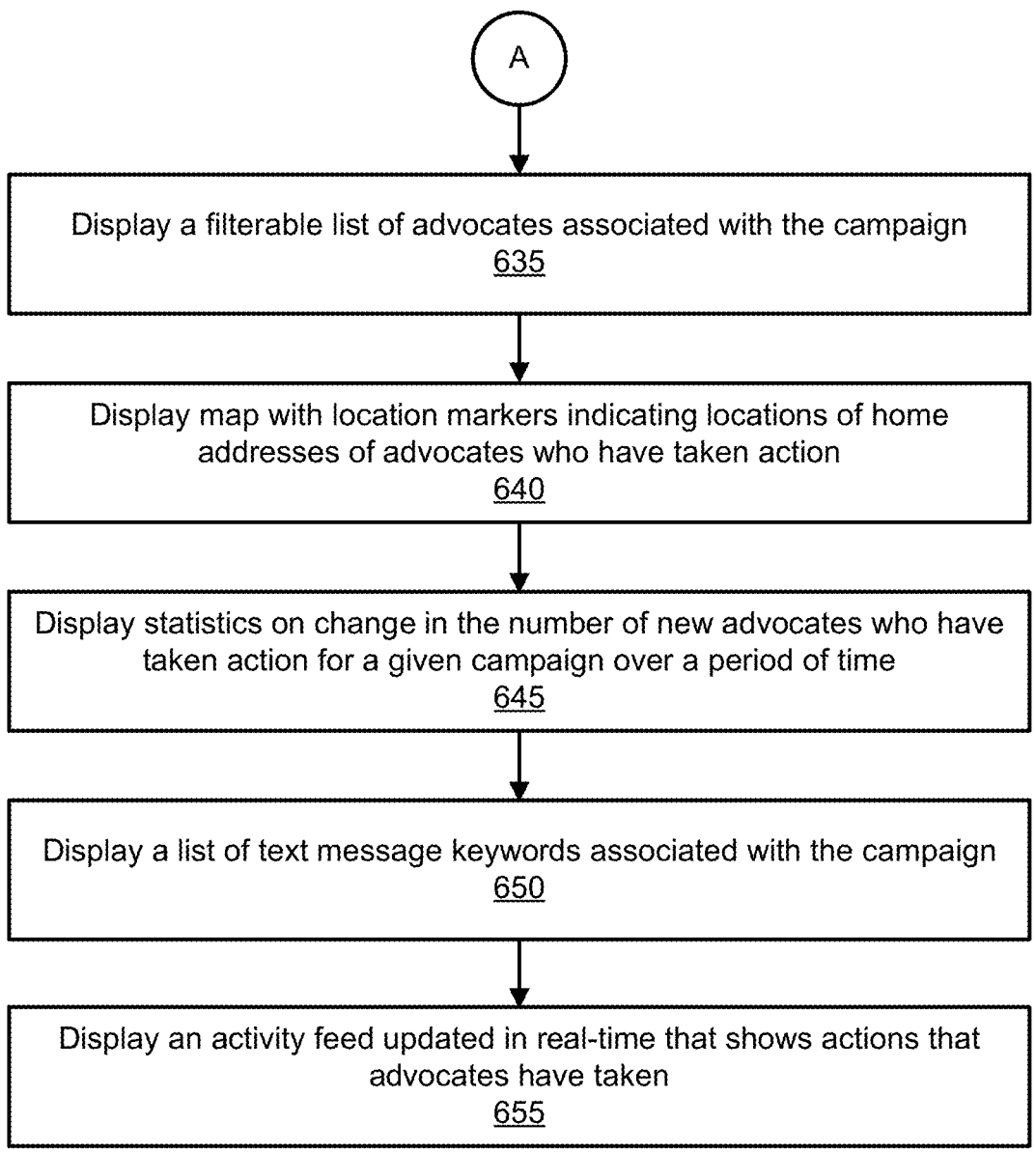

The blocks shown in the flow diagram of FIGS. 6A-6B are performed by the analytics engine 260, and example screenshots of the dashboard generated by the analytics engine 260 are shown in FIGS. 11-18.

Figure 4:
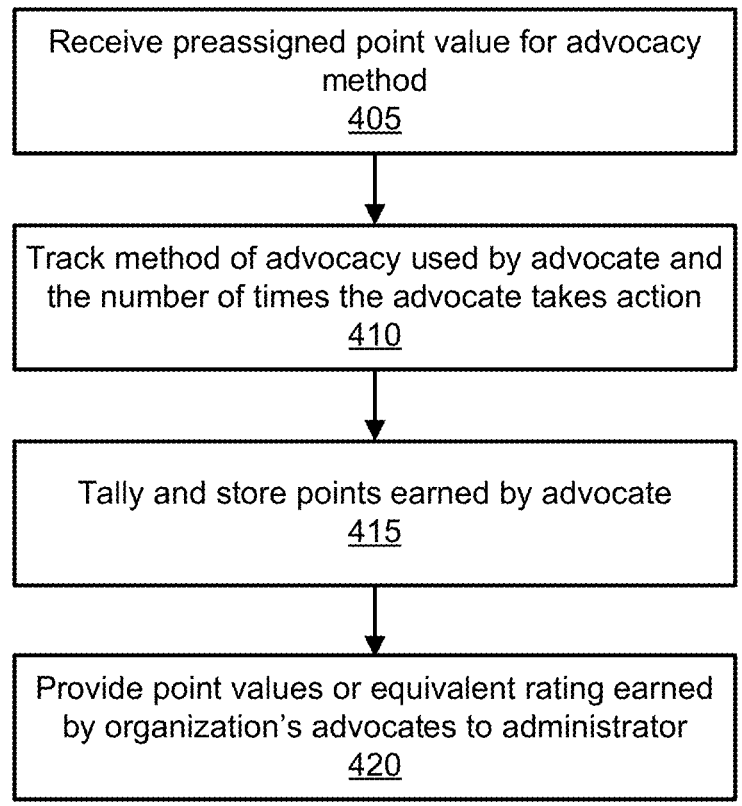
FIG. 4 depicts a flow chart illustrating an example process for rating advocates based upon levels of engagement.

The advocacy rating module 262 tracks and tallies the number of times an advocate takes an action, such as sending an email message; sending a Twitter message; sharing a message on Facebook; placing a phone call regarding a campaign, receiving, opening, or clicking an email; receiving or sending a text message; or clicking a link, and the type of action taken. Additional social media sharing events can also be tracked in the platform. The advocacy rating module 262 can also convert the tracked information into a rating for each advocate, where the rating assigned to an advocate is higher the more times the advocate takes action. Additionally, some types of action may be given a higher weight than other types of action, for example, a phone call to an elected official/legislator may be rated higher than a Twitter message. The blocks shown in the flow diagram of FIG. 4 are performed by the advocacy rating module 262.

The keyword tracker module 264 receives text messages from individuals with keywords that correspond to specific campaigns or services. When the keyword tracker module 264 receives a text message with an active keyword, it will generate a unique short link to the landing page for the campaign or service associated also with an advocate's phone number and/or other contact information, and send a response text message containing the short link to the individual that texted the keyword.

The link tracking module 266 receives and tracks a response from an advocate via a click on a short link generated by link generation module 230 that was provided in a text message, email message, Twitter message, or an electronic form of advertisement, such as a social media post.

The advocates database 270 includes data pertaining to advocates. The advocates database 270 can be populated by organizations importing names and contact information of individuals who may or may not be members into the advocates database 270, or by advocates responding to the server and voluntarily providing requested contact information. The advocates database 270 can include information about each advocate, such as home street address, home city, county and state, latitude and longitude, legislative districts, home zip code, telephone number, email address, advocacy rating, social and demographic data, and organization and campaign(s) with which the advocate is associated.

The campaign database 280 includes data pertaining to campaigns that are administered or implemented by organizations using the host connections server 130. Campaign database 280 entries can include information such as the organization initiating the campaign, a description of the issue of interest, a text-based entry or recording of instructions for an advocate selecting to call an elected official/legislator about an issue, and a template email message and/or a template Twitter message for an advocate to send to an elected official/legislator.

The legislator database 275 includes any information pertaining to elected officials/legislators in a given district obtained either from the elected official/legislator look-up reference servers or from other sources including but limited to local sources. An example of information that is obtained from a source outside of the elected official/legislator look-up reference servers is when an elected official has left office.

In some embodiments, one or more of the advocates database 270, the legislator database 275, and the campaign database 280 can be made up of several separate databases and/or be external to the host connections server 130.

FIGS. 3A-3E depict a flow chart illustrating an example process for sending a request for advocacy to targeted individuals, and facilitating each individual's selected method of advocacy.

Block 305 is an optional step where the connections server receives from an organization the names and contact information of targeted advocates or members of the organization, and the server stores the advocate information with the name of the organization in the advocates database. Organizations are not required to perform this step as advocates can enter their own information when they respond to a call to action.

Then at block 310, the server receives campaign information from the organization. Examples of campaign information include, but are not limited to, the issue that the organization is requesting that an advocate support, why an advocate should support the issue, how an advocate can support the issue, and the methods that the server should offer for facilitating contact between the advocate and an elected official/legislator. This is referencing data stored in the campaign database 280.

The organization can then specify one or more methods for sending a call to action for a campaign. With one method, at block 312, the server can send a call to action as a text message to the advocates who are associated with the organization, for example, advocates who were previously entered at block 305, or advocates who have previously taken action in response to a previous call to action by the organization. The text message can include a keyword associated with the campaign and a number to which interested advocates can text the keyword. Alternatively or additionally, the text message can include a uniquely generated short link embedded in the message, which has been assigned to the individual advocate for tracking purposes. When a supporter clicks on the short link, it takes the supporter to a webpage or landing page for the campaign. An example of a campaign landing page is shown in FIG. 7. In some embodiments, the server can send out an email message or a social media message, such as a Twitter or Facebook message, with the keyword and/or short link instead of or in addition to sending the text message.

Another method for delivering a call to action is to announce the call to action live, for example, at an event with potential supporters in attendance, or through an advertisement placed using one or advertising media, such as television, radio, billboards, and newspapers. With any of these methods, the call to action includes a keyword associated with the campaign and a number to which interested supporters can send the keyword via text message. Advantageously, the keyword can be different for each of these advertisement media for a given campaign to facilitate tracking from where supporter traffic originates. For electronic print advertisements, such as emails or social media posts, for example, published on Facebook, a short link can be included that takes the supporter to the landing page for the campaign.

At block 320, the server receives a text message with the keyword from an interested advocate, and at block 325, the server sends a text message back to the interested advocate that contains a short link that is associated with the campaign. The process continues to block 327.

Alternatively or additionally, at block 330, the link tracking module 266 can receive a response from an advocate via a click on a short link generated by link generation module 230 that was provided in a text message, email, Twitter message, or an electronic form of advertisement, such as a social media post.

Next, at block 327, the server requests and receives the advocate's name, and at decision block 335, the server determines whether the advocate is already in the advocates database because the advocate's data was previously entered or imported from the organization's database at block 305, or the person already took action on this campaign or a previous campaign.

If the advocate's phone number, email address, or other unique identifier does not match a record in the advocates database (block 335—No), at block 340, the server requests and receives, via a graphical user interface (GUI) on the landing page, the advocate's home street address, zip code, email address and name, and the process continues to block 345. If the advocate was matched with a record in the database (block 335), then the server only requests required information not already available in the advocate database 270 for the advocate.

At block 345, the server sends the advocate's home address and zip code to one or more geocoding services, such as Yahoo Boss Geo or Google Maps. In response, the server receives at block 347 the latitude and longitude, and normalized address components corresponding to the advocate's home address from the geocoding service.

Then at block 349, the server sends the latitude and longitude information to one or more services that identify the elected officials/legislators serving that location, for example, Cicero database API, Google Civic Information API, and Sunlight database API. The services match street level geocoding information against the elected officials/legislators in their databases at the local, state, and/or federal level. In some cases, more than one service is consulted because one service may only provide information for elected officials for certain offices. In some embodiments, the server may store data acquired outside of the elected official/legislator look-up reference servers in the legislator database, for example, when local information is acquired regarding an elected official who has recently left office before the official's term has ended. At block 351, the server receives the requested elected official/legislator data, and the data is presented to the advocate via the campaign's landing page.

Next, at block 355, the server receives the advocate's selection of a preferred method of advocacy, such as phone call, Twitter message, or email. The example campaign landing page shown in FIG. 7 shows three icons, one corresponding to each method of advocacy facilitated by the server. At block 355, the server also receives the advocate's selection of the elected official/legislator to be contacted.

Figure 8:
FIG. 8 depicts a screenshot showing an example of a webpage for taking action via phone call.

If the advocate selects a phone call as the preferred method of advocacy, at block 360, the server provides an option to click on a phone number to be connected with the advocate's elected official/legislator or to enter a number at which the advocate will be called by the server. An example screenshot of the webpage facilitating the phone call method is shown in FIG. 8.

At decision block 362, the server determines whether the advocate clicked on the provided phone number. If the advocate opted to enter a number for a call from the server (block 362—No), at block 364, the server receives via the GUI, the advocate number for calling.

Then at block 366, the server initiates the call to the advocate at the provided phone number. Next, at block 368, the server prepares the advocate for the call with the elected official/legislator by providing coaching to the advocate on what to say and/or not say. After the advocate has been prepared for the call, at block 370, the server connects the advocate to the elected official/legislator. The server can also track whether the call was completed and the duration of the call, for example, through the use of a VOIP (Voice over Internet Protocol) service, such as Twilio.

At decision block 372, the server determines via the GUI whether the advocate wishes to take another action, such as contact the same elected official/legislator using a different method of advocacy, or contact another official. If the advocate indicates interest in taking additional action (block 372—Yes), the process returns to block 355. If the advocate does not wish to take another action (block 372—No), the process ends at block 399.

Returning to decision block 362, if the advocate clicked on the provided phone number (block 362—Yes), the process continues to block 368, as described above.

Returning to block 355, if the advocate selects an email as the preferred method of advocacy, at block 380, the server requests via a GUI on a webpage linked to the landing page the advocate's name, phone number, street address, and zip code. An example screenshot of the webpage facilitating the email method is shown in FIG. 9.

Then at block 382, the server provides a template email to the advocate for review and/or editing. Next, at block 384, the server enters the advocate's name, email address, and phone number in the template email. And at block 386, upon receiving instructions from the advocate, the server sends the email and tracks delivery of email whether the email was opened.

Figure 10:
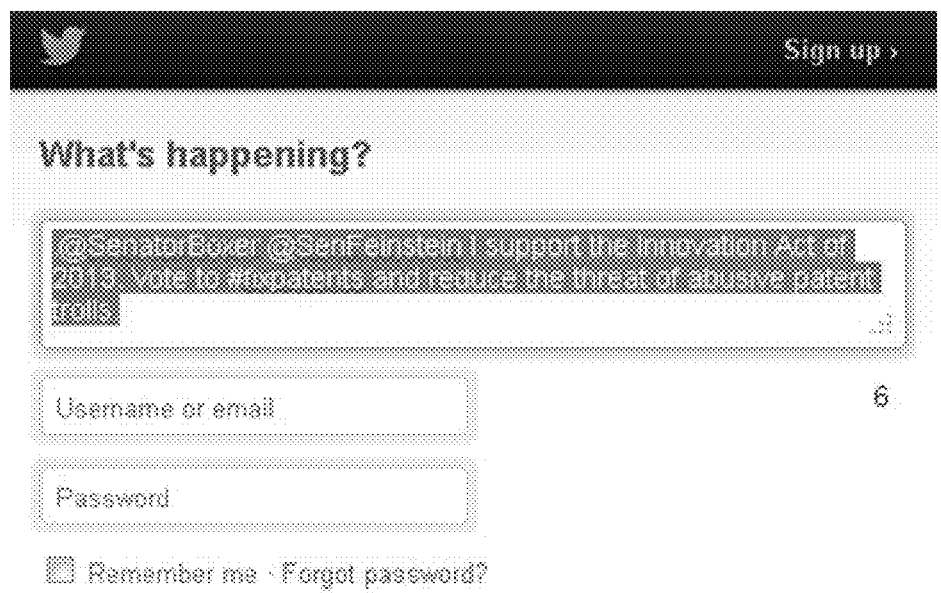
FIG. 10 depicts a screenshot showing an example of a webpage for taking action via a Twitter message.

Returning to block 355, if the advocate selects a Twitter message as the preferred method of advocacy, at block 390, the server provides a template Twitter message to the advocate that is addressed to the advocate's selected/determined official/legislator. An example screenshot of the webpage facilitating the Twitter message method is shown in FIG. 10. Then at block 392, the server requests and receives via the webpage the advocate's Twitter user name or email address and password. And at block 394, upon receiving an indication from the advocate, for example, by clicking a button to send the message, the server sends the Twitter message, tracks the delivery of the message, and shortens and tracks links embedded in the message.

Alternatively, in some cases, at block 390, the advocate can authorize the server to connect with the advocate's Twitter account, for example, using OAuth.

Advocates who are active in one campaign are more likely to be active in subsequent campaigns, and thus, are more valuable. The server can rate an advocate based on how often and which methods of advocacy the advocate has used in the past. FIG. 4 depicts a flow chart illustrating an example process for rating advocates based upon levels of engagement with one or more campaigns.

At block 405, the server receives a pre-assigned point value of different advocacy methods. For example, an advocate who calls an elected official/legislator to support an issue may be assigned three points, an advocate who sends an email to an elected official/legislator may be assigned two points, and an advocate who sends a Twitter message may be assigned one point. Then at block 410, the server tracks the method of advocacy used by an advocate and the number of times the advocate takes action. The advocates' actions are tracked relative to the total number of actions available to a given advocate for a given campaign or overall.

Next, at block 415, the server tallies the points earned by the advocate and stores or updates the point value in the advocate database. In some cases, the number of earned points can be converted to an equivalent rating system. For example, zero points can correspond to zero stars on a scale of zero to five stars; one point can correspond to one star; two points can correspond to two stars; three points can correspond to three stars; four points can correspond to four stars, and five or more points can correspond to five stars.

At block 420, the administrator of the organization can request the point values or equivalent rating earned by each advocate associated with the organization. Then advocates with one or more stars can be targeted for future campaigns, or contact information for those advocates can be used or deployed according to terms of service.

The server's functionality has been described with respect to contacting individuals associated with an organization to support, reject, or comment on an issue. Additionally, the server can be used to facilitate delivery of services to the general public, for example, how to receive more information for government scholarships.

Figure 5:
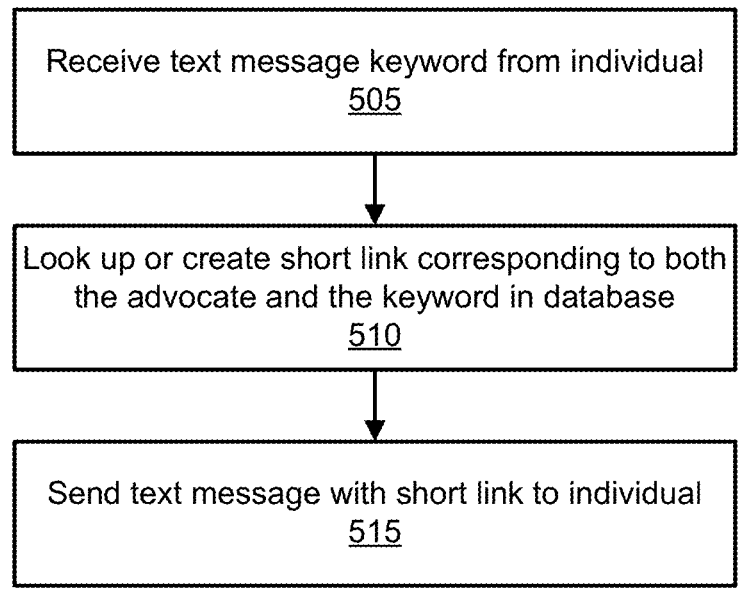
FIG. 5 depicts a flow chart illustrating an example process for receiving an election to opt-in to receive more information and texting an appropriate short link in response.

FIG. 5 depicts a flow chart illustrating an example process for receiving an election to opt-in to receive more information and texting an appropriate short link in response. Advertisements for a particular service or opportunity have previously been placed using one or more media, such as television, radio, newspapers, and social media, where the advertisements include a keyword associated with the service, and in the cases of electronic print media, a short link to a webpage associated with the service is provided.

At block 505, the server receives from an individual a text message containing the keyword associated with the service. Then at block 510, the server looks up the short link corresponding to the keyword and advocate in the database, or creates a short link to the appropriate information for the service.

Next, at block 515, the server sends a text message that contains the short link back to the individual. The website to which the short link points can be hosted by the connections server or by any other server. Additional information, such as address of the individual or other information relevant to the service can be requested by the website to provide further information about the service to the individual.

The server also provides analytical information in a convenient user interface to an administrator of a campaign, where the campaign can be an issue-driven campaign seeking supporters, or a service delivery campaign. The user interface includes a dashboard that aggregates a filtered set of the actions that supporters of the campaign have taken and displays the information graphically in a visual form that is readily understandable. FIGS. 6A-6B depict a flow chart illustrating an example process for providing analytical information for a campaign.

The server provides a list of campaigns to the user that are either currently active or have already concluded, and at block 605, the server receives a selection of a particular campaign for displaying dashboard analytics.

Figure 11:
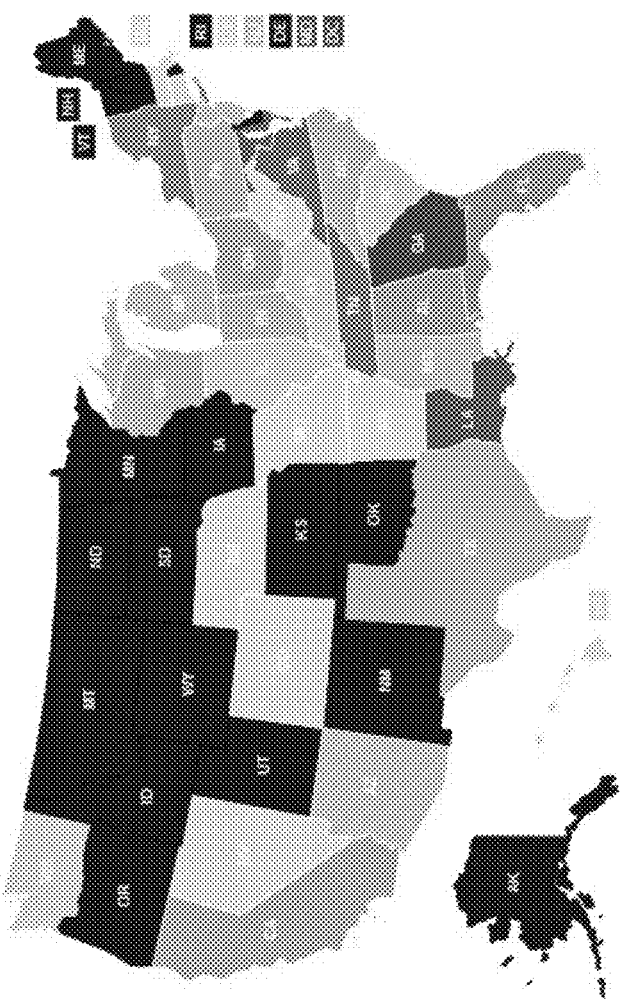
FIG. 11 depicts a screenshot showing an example color-coded map that indicates the number of advocates who have taken action for a campaign in each state.

Next, at block 610, the server displays a map of the United States with color-coded states where the color coding is based on the number of advocates who have taken action in each state for the selected campaign. Alternatively, other relevant regions can also be shown, such as a state with color-coded counties, legislative districts, and census metropolitan statistical areas. FIG. 11 depicts a screenshot showing an example color-coded map. The server can also provide the specific number of advocates from each state in the map or as a pop-up value.

Figure 12:
FIG. 12 depicts a screenshot showing a table of the states with the most number of advocates who have taken action for an example campaign.

At block 615, the server displays the number of advocates who have taken action for the campaign. The number of advocates is the total number of people who are associated with at least one of organization's campaigns. The server also displays at block 615 the number of connections or actions taken by the advocates. So if an advocate contacts both of his state's senators, two connections have been made. The bottom of the example screen shot of FIG. 12 shows the number of advocates and the number of connections for an example campaign.

At block 620, the server displays a listing of geographical regions such as states and cities and the number of advocates who have taken action from each region. The listing of regions can be organized numerically based on the number of advocates, with the regions having the most advocates who have taken action listed at the top. The top of the example screen shot of FIG. 12 shows a table of the regions with the most number of advocates who have taken action for an example campaign.

Figure 13:
FIG. 13 depicts a screenshot showing a table of legislators and the number of times each legislator has been contacted for an example campaign.

At block 625, the server displays a list of legislators and the number of times each legislator has been contacted. Thus, if an advocate contacts a legislator twice, each contact is included separately in the total count of connections. FIG. 13 depicts a screenshot showing a table of legislators and the number of times each legislator has been contacted for an example campaign.

Figure 14:
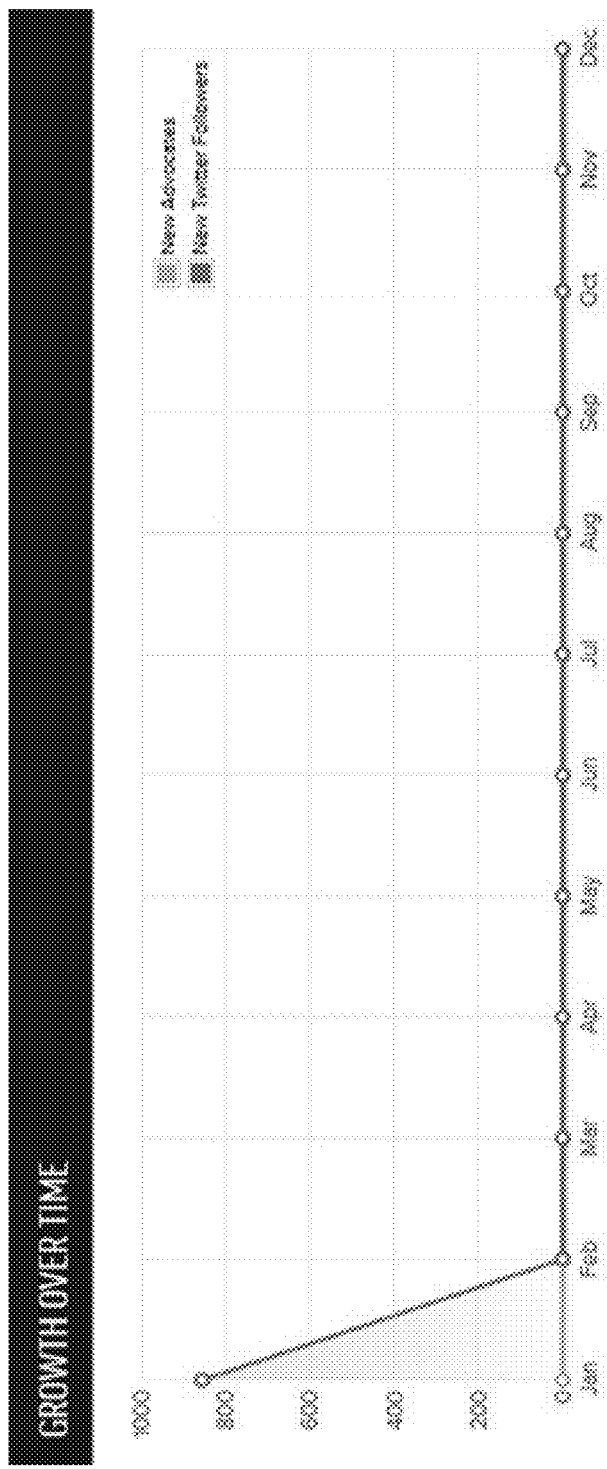
FIG. 14 depicts a screenshot showing a graph of the growth over time of new advocates and social media followers for an example campaign.

At block 630, the server displays a graph of growth over time of the number of new advocates who have taken action for the campaign. The server can also integrate the graph with social media sites, such as Facebook and Twitter Insights, to show social-media follower growth for the organization's social media account over time. FIG. 14 depicts a screenshot showing a graph of the growth over time of new advocates and social media followers for an example campaign.

At block 635, the server displays a filterable list of advocates who are associated with the campaign, where the list can include contacts imported into the advocates database by the organization administering the campaign and advocates who have taken action on behalf of the organization's campaign. The list can also include information about the advocate, such as county and state of residence, email address, phone number, and rating by the server based on the number of actions taken. Example filters that can be used on the list of advocates include legislators contacted, state, and issue.

Figure 18:
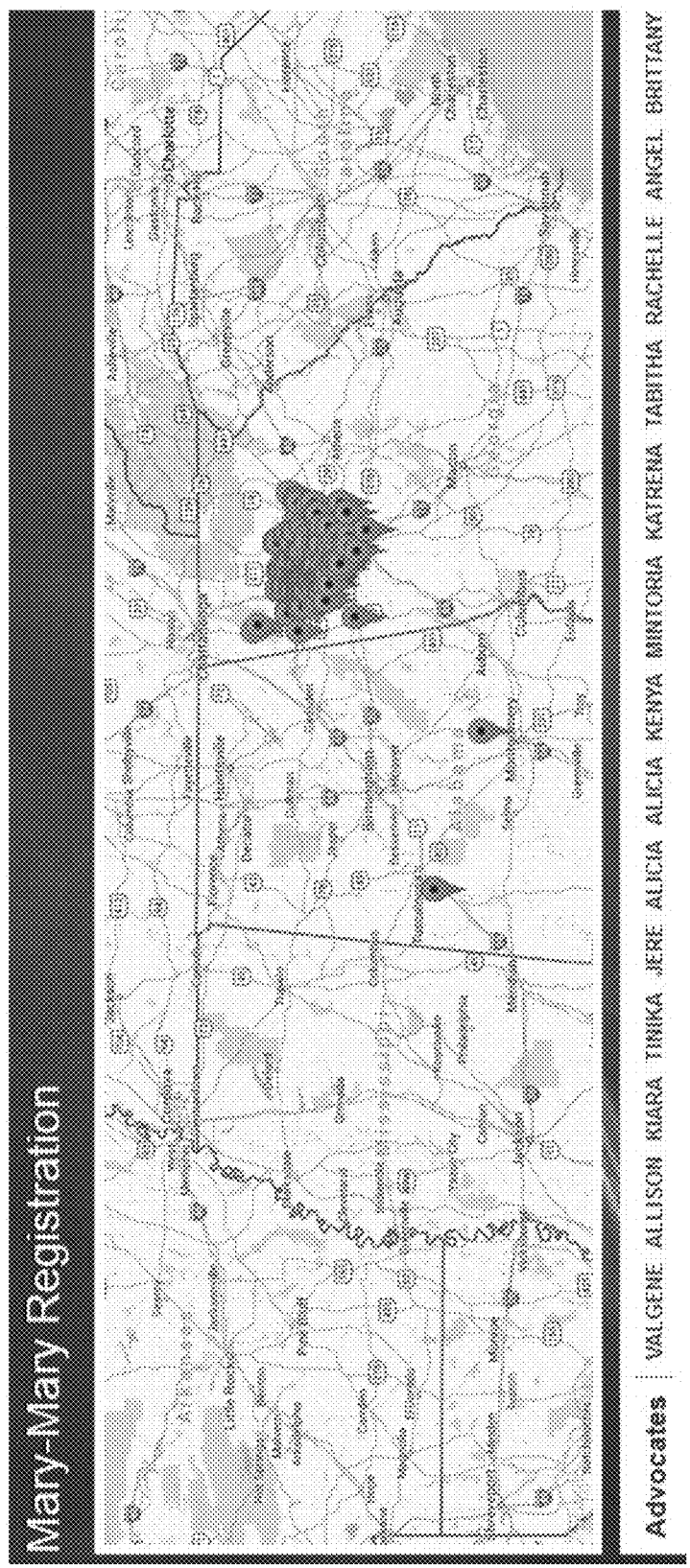
FIG. 18 depicts a screenshot showing an example of a map with location markers indicating the address for each advocate in the region who has taken action.

At block 640, the server displays a map that has markers indicating locations of home addresses of advocates who have taken action for a campaign. Regions where few or no advocates have taken action may indicate areas that the campaign should target more closely. FIG. 18 depicts a screenshot showing an example map with location markers indicating the address for each advocate in the region who has taken action.

For any of the blocks 610-640, the time range over which the data is shown can be selected, for example, the last week, the last month, or the entire duration of the campaign.

Figure 16:
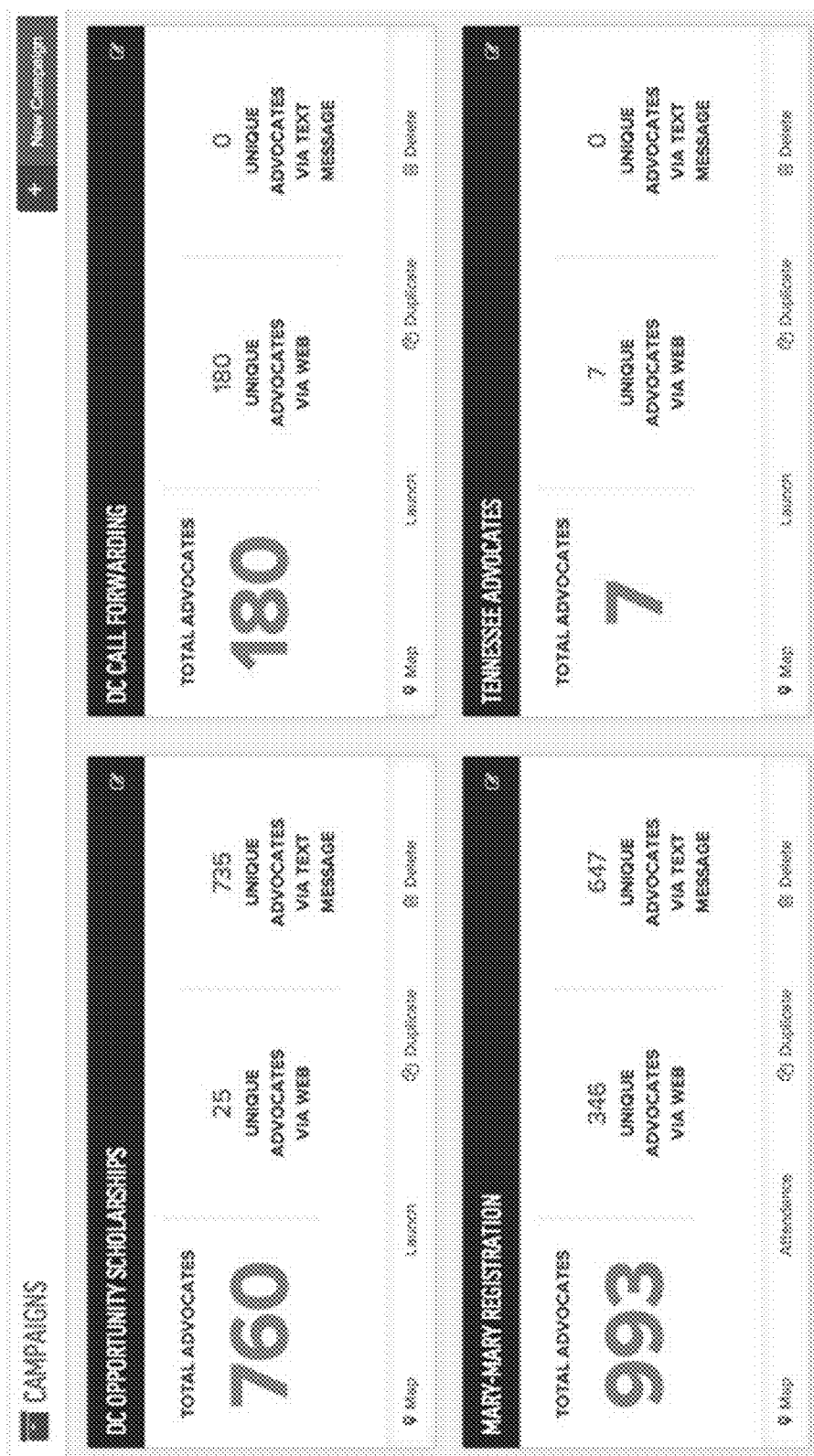
FIG. 16 depicts a screenshot showing a summary of example campaigns initiated by organizations via the server.

At block 645, the server displays statistics on the type of electronic source the advocate comes from, for example, text message or via the web. FIG. 16 depicts a screenshot showing a summary of example campaigns administered by organizations via the server displaying the number of advocates who accessed the campaign via web and via text message.

At block 650, the server displays a list of text message keywords associated with the campaign. The list can also include the number of text messages that have been received with each keyword, the number of different advocates who have sent a text message with the keyword, and the conversion rate. The conversion rate is the percent of advocates who send a text message with the keyword and who then take action for that campaign. FIG. 17 depicts a screenshot showing a keyword report for an example campaign.

Figure 15:
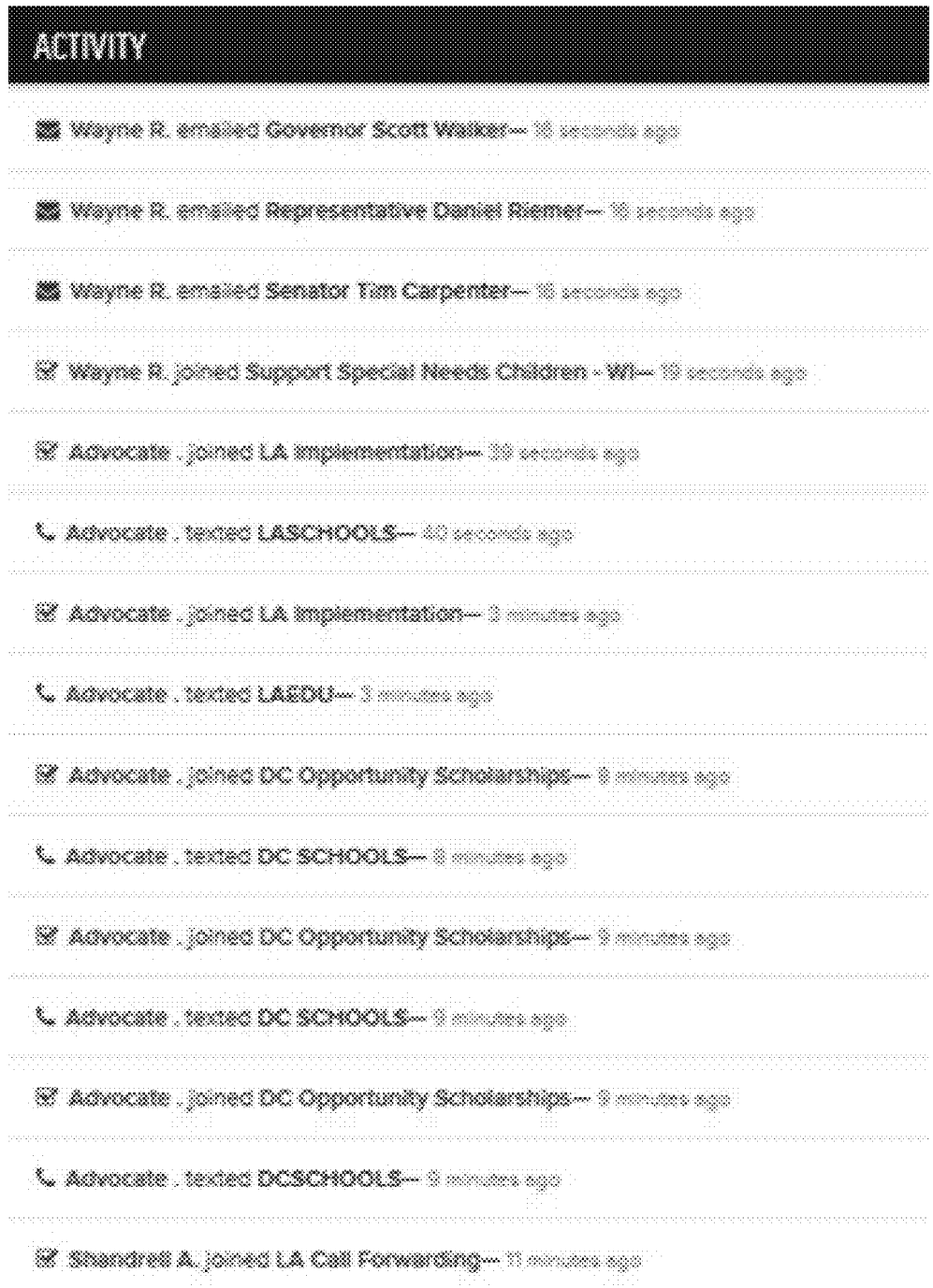
FIG. 15 depicts a screenshot showing an example of an activity feed for a client organization of the server.

At block 655, the server displays an activity feed that is updated in real-time and includes the action that has been taken by advocates for a specific client and how long ago the action was taken. The client can have more than one campaign running simultaneously, and the activity feed can provide updates for all campaigns for the client or updates that pertain to a specific campaign. FIG. 15 depicts a screenshot showing an example of an activity feed for a client organization of the server.

Figure 19:
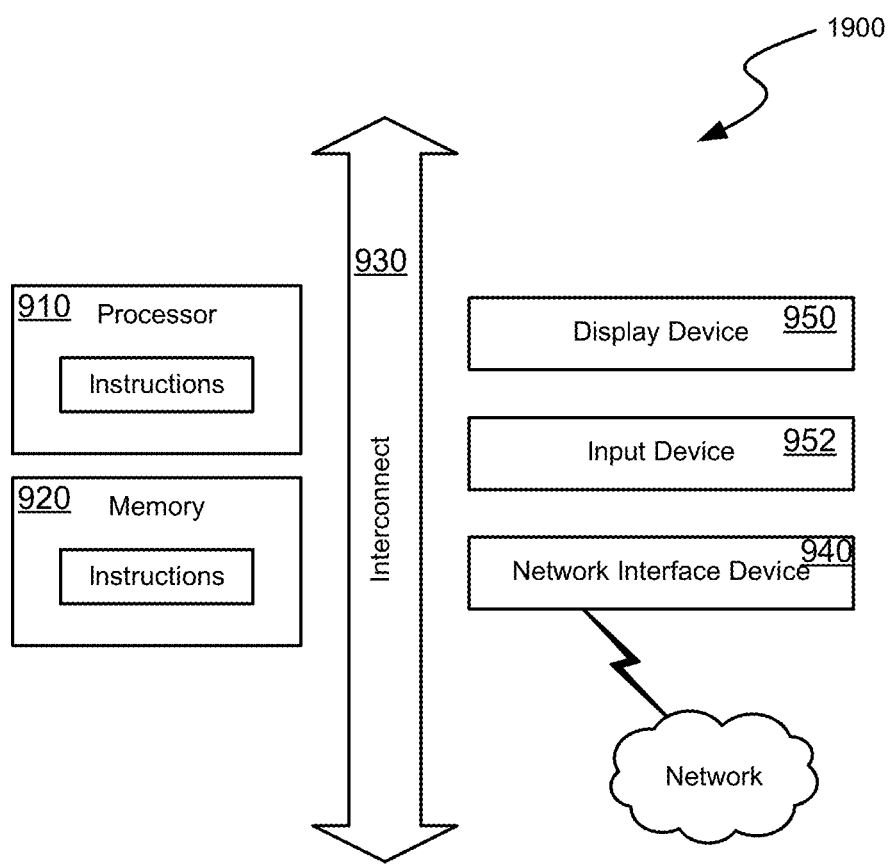
FIG. 19 shows a diagrammatic representation of a machine in the example form of a computer system within which a set of instructions, for causing the machine to perform any one or more of the methodologies discussed herein, may be executed.

FIG. 19 shows a diagrammatic representation of a machine 1900 in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 900 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

CONCLUSION

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the embodiments is not intended to be exhaustive or to limit the embodiments to the precise form disclosed above. While specific examples for the embodiments are described above for illustrative purposes, various equivalent modifications are possible within the scope of the embodiments, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the embodiments.

Any patents and applications and other references noted above, including any that may be listed in accompanying filing papers, are incorporated herein by reference. Aspects of the embodiments can be modified, if necessary, to employ the systems, functions, and concepts included in such references to provide further implementations of the embodiments.

These and other changes can be made to the embodiments in light of the above Detailed Description. While the above description describes certain examples of the embodiments, and describes the best mode contemplated, no matter how detailed the above appears in text, the embodiments can be practiced in many ways. Details of the system may vary considerably in its specific implementation, while still being encompassed by the embodiments disclosed herein. As noted above, particular terminology used when describing certain features or aspects of the embodiments should not be taken to imply that the terminology is being redefined herein to be restricted to any specific characteristics, features, or aspects of the embodiments with which that terminology is associated. In general, the terms used in the following claims should not be construed to limit the embodiments to the specific examples disclosed in the specification, unless the above Detailed Description section explicitly defines such terms. Accordingly, the actual scope of the embodiments encompasses not only the disclosed examples, but also all equivalent ways of practicing or implementing the embodiments under the claims.

While certain aspects of the embodiments are presented below in certain claim forms, the applicant contemplates the various aspects of the embodiments in any number of claim forms. For example, while only one aspect of the embodiments is recited as a means-plus-function claim under 35 U.S.C. § 112, sixth paragraph, other aspects may likewise be embodied as a means-plus-function claim, or in other forms, such as being embodied in a computer-readable medium. (Any claims intended to be treated under 35 U.S.C. § 112, ¶ 6 will begin with the words "means for.") Accordingly, the applicant reserves the right to add additional claims after filing the application to pursue such additional claim forms for other aspects of the embodiments.

We claim:

1. A method for determining an advocate for a campaign, comprising:
    providing, by one or more processors of a platform interface, to an organization campaign graphical user interface (GUI) for receiving a submission from an organization, one or more advocacy issues, and storing the advocacy issues in a campaign database;
    receiving, by the one or more processors of the platform interface, selection information associated with a selection in the organization campaign GUI of an elected official that should receive communications from advocates for a specific campaign based on party affiliation and a political issue from the one or more advocacy issues;
    automatically selecting one or more advocates in the campaign database to participate in the campaign, the one or more advocates generated in real-time by:

transmitting, by a host connection server, an individual message, generated by a link processor, associated with a first advocacy campaign related to the political issue;

in response to receiving the individual message indicating the individual is opting into a campaign, analyzing text of the message to identify the message as associated with the first advocacy campaign;

generating, based on a unique identifier associated with the individual, a unique individual-specific link associated with the individual to a website for the advocacy campaign, and storing the unique identifier in a first database;

receiving, by the host connection server, a response from the individual generated by activating the unique individual-specific link that was transmitted to the individual;

automatically tracking information associated with the response based on the identifier associated with the individual and the unique individual-specific link, wherein the tracked information includes a street address and zip code of a residence of the individual, and a geocode of the street address for automatically determining by the server an identity of an elected official for a district including the street address from a first database of elected officials based upon geocoding of the street address and zip code, and establishing a communication connection between the individual and the determined elected official, wherein a type of the communication connection from a plurality of types of communication connections is selected by the individual;

providing, by the one or more processors of the platform interface, information associated with advocates related to the organization campaign GUI for determining specific information about a political issue from the one or more advocacy issues, determining the specific information for displaying in the organization campaign GUI by aggregating information about the individual with stored information about other individuals, comprising:

assigning point values to each type of communication;

tracking a number of communications and the types of communication used by the individual;

tallying points earned by the individual and storing the points in the second database with the stored information about the individual;

rating the individual based on the points earned by the individual;

comparing the rating of the individual with other individuals that responded to the first advocacy program;

comparing the point value of the individual earned in the first advocacy program with points earned by the individual in at least a second advocacy programs; and Automatically selecting additional individuals for additional communication regarding the first advocacy program or additional advocacy programs based on the rating of the individual.

* * * * *

UNITED STATES PATENT AND TRADEMARK OFFICE
CERTIFICATE OF CORRECTION

PATENT NO. : 11,057,339 B1
APPLICATION NO. : 14/165539
DATED : July 6, 2021
INVENTOR(S) : Patrick Stoddart et al.

Page 1 of 1

It is certified that error appears in the above-identified patent and that said Letters Patent is hereby corrected as shown below:

In the Claims

Column 18, Line 26, Claim 1, delete "Automatically" and insert -- automatically --

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*